United States Patent Office 3,441,560
Patented Apr. 29, 1969

3,441,560
CYCLOPROPYL-2-SULPHANILAMIDO-
PYRIMIDINES
Markus Zimmermann, Riehen, Switzerland, assignor to Geigy Chemical Corporation, Ardsley, N.Y., a corporation of New York
No Drawing. Filed Mar. 14, 1967, Ser. No. 622,899
Int. Cl. C07d 51/44; A61k 27/00
U.S. Cl. 260—239.75    12 Claims

ABSTRACT OF THE DISCLOSURE 2-sulfanilamido-pyrimidines substituted by a cyclopropyl group in 4-, 5- or 6-position which are antibacterial agents against gram-positive bacteria such as staphylococci, streptococci, pneumococci and against gram-negative bacteria such as Salmonella, Escherichia and Klebsiella strains; pharmaceutical compositions containing the aforesaid pyrimidines as antibacteria ingredients, and method of treating diseases caused by such bacteria, by administration of such pyrimidines or pharmaceutical compositions containing them.

BACKGROUND OF THE INVENTION

Field of the invention

The invention concerns new sulphanilamide derivatives, a process for the production thereof, medicaments which contain the new compounds and the use thereof.

Summary of the invention

The invention provides, in a first aspect, novel sulfanilamido-pyrimidines of the formula:

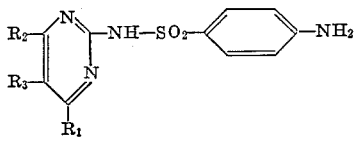

(I)

wherein $R_1$ represents hydrogen, halogen, a lower alkyl, lower alkoxy or lower alkylthio group, and one of $R_2$ and $R_3$ represents the cyclopropyl group, and when $R_3$ represents the cyclopropyl group, $R_2$ represents hydrogen, halogen, a lower alkyl, lower alkoxy or lower alkylthio group, and when $R_2$ represents the cyclopropyl group, $R_3$ represents hydrogen, a lower alkyl or lower alkoxy group, as well as their salts with inorganic or organic bases; these novel compounds have an excellent antibacterial action, which being practically harmless to mammals when used in antibacterially effective dosages, are therefore useful as antibacterial agents in the treatment of infectious diseases.

In a second aspect, the invention provides pharmaceutical compositions containing an antibacterially effective amount of a compound according to the invention and a pharmaceutically acceptable carrier therefor.

A third aspect of the invention provides for a method of treating infectious diseases in mammals by administering to an individual suffering therefrom an antibacterially effective amount of a compound according to the invention.

Detailed description of the invention and preferred embodiment

In the compounds of general Formula I, $R_1$, $R_2$ and $R_3$ as alkyl groups are, e.g. the methyl, ethyl, propyl or the isopropyl group and, as alkoxy groups they are, e.g. the methoxy group. In addition, as alkylthio groups, $R_1$ and $R_2$ are, e.g. the methylthio or the ethylthio group.

As halogen atoms $R_1$ and/or $R_2$ represent especially chlorine or bromine, but most preferably chlorine.

To produce these new compounds, a compound of the general Formula II:

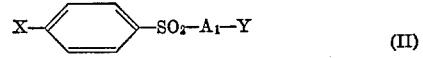

(II)

is reacted, optionally in the presence of an acid binding agent, with a compound of the general Formula III:

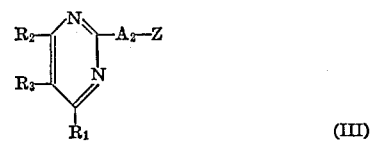

(III)

wherein X represents the amino group or a nitrogen-containing group which can be converted into the amino group, one of the two symbols $A_1$ and $A_2$ represents the imino group (—NH—) and the other represents the direct bond, Y and Z represent reactive radicals which can be split off together, and $R_1$, $R_2$ and $R_3$ have the meanings given in Formula I, to form a compound of the general Formula IV:

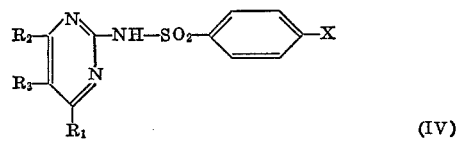

(IV)

wherein $R_1$, $R_2$, $R_3$ and X have the meanings given in Formula I, if necessary, the group X of the above reaction product is converted into the free amino group, and/or, if desired, a reaction product containing halogen atoms, particularly chlorine atoms, as radicals $R_1$ and/or $R_2$ is reacted with a metal compound of a low alkanol or alkane thiol, or the reaction product is reduced until the halogen atom $R_1$ or $R_2$ or the halogen atoms $R_1$ and $R_2$ is/are eliminated and, if desired, the reaction product is converted into a salt with an inorganic or organic base. When $A_1$ is the imino group and $A_2$ is the direct bond, Y is, e.g. a monovalent cation, particularly an alkali metal ion, or the normal equivalent of a polyvalent cation, and Z is a halogen atom, particularly a chlorine or bromine atom, also a cyanoamino or nitroamino radical or, if $R_1$ and/or $R_2$ is not an alkylthio group, Z is a low alkylsulphonyl radical. On the other hand, when $A_1$ is the direct bond and $A_2$ is the imino group, when Y is, e.g. a halogen atom, particularly a chlorine atom, or an acyloxy radical, e.g. a radical of the general Formula IVb:

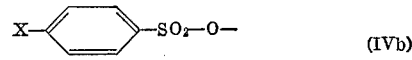

(IVb)

and Z is a hydrogen atom, while X in this case is preferably not a free amino group.

The reactions of compounds of the general Formula II with those of the general Formula III are performed, e.g. while heating in a suitable organic solvent such as dimethyl formamide, acetamide, N,N-dimethyl acetamide or dimethyl sulphoxide. When an acid is formed as liberated compound Y–Z, the reaction is performed in the presence of an acid binding agent such as pyridine or trimethylamine in methylene chloride. In addition, free sulphonic acids ($A_1$ is the direct bond, Y=OH) can be reacted with 2-acetamido-pyrimidine derivatives

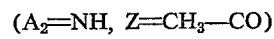

($A_2$=NH, Z=CH$_3$—CO)

e.g. in a low alkanol.

The conversion of the group X of the reaction product of the general Formula IV which may subsequently be necessary is a hydrolysis or a reduction in the broadest sense depending on the type of this group. Radicals X which can be converted by hydrolysis into the amino groups are e.g. acylamino radicals such as the acetamido into the amino group are, e.g. the nitro group or substituted methylene amino radicals such as the benzylidene amino radical, or the p-dimethylamino benzylidene amino radical. The hydrolysis of corresponding compounds of general Formula IV to liberate the amino group can be performed e.g., in an acid medium such as by heating in dilute methanolic hydrochloric acid, or it can be performed under alkaline conditions, e.g. by means of 1 N to 2 N sodium hydroxide solution at temperatures between 20–100°. Radicals which can be converted by reduction into the amino group are, e.g. the nitro group or substituted azo radicals such as the phenylazo or p-dimethylamino-phenylazo radical, also, e.g. the benzyloxycarbonylamino radical or the benzylidene amino radical. The reduction of these groups which can be reduced or cleaved by reduction can be performed in general by catalytic means, e.g. with hydrogen in the presence of Raney nickel in an inert organic solvent, but also non-catalytic processes such as the reduction of nitro groups and also azo groups by means of iron in acetic or hydrochloric acid can be used. A radical which can be reduced to the amino group is also the nitrilo radical

which is bound by one of its three valences to the benzene ring. In this case, the general Formula II represents the divalent radical of Formula IIa:

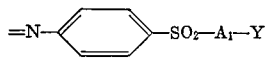 (IIa)

wherein $A_1$ and Y have the above-given meanings, which is bound to a similar radical to form a derivative of azobenzene-4,4′-disulphonic acid while forming a central azo group. This derivative is reacted with two molecules of a pyrimidine derivative of the general Formula III.

Reactions of compounds of general Formula IV in which $R_1$ and/or $R_2$ are chlorine, with metal compounds, particularly alkali metal compounds such as sodium compounds, of low alkanols are most easily performed using the alkanol concerned as solvent, while heating, e.g. at the boiling temperature or at a raised temperature in a closed vessel. Also, dimethyl sulphoxide or dimethyl formamide can be used as solvent. The same solvents and the same temperatures are also suitable for the reaction of compounds of general Formula I wherein $R_1$ and/or $R_2$ represent halogen, with alkylmercaptides, in particular with alkali metal alkylmercaptides. A halogen atom is eliminated by reduction, particularly a chlorine atom $R_1$ and/or $R_2$ by, e.g. catalytic hydrogenation in the presence of a base; for example palladium-barium sulphate is used as catalyst and aqueous sodium hydroxide solution is used as a reaction medium. The compounds of general Formula IV used for the reactions mentioned above can be obtained therefrom by conversion of the group X into the free amino group. Optionally, the replacement of a chlorine atom $R_1$ and/or $R_2$ by hydrogen can be performed in the same step as the reduction of a group X suitable therefor, e.g. the nitro group.

To produce a first group of starting materials of the general Formula III wherein $A_2$ is the direct bond, Z is a low alkylsulphonyl group or a halogen atom, $R_1$ and $R_2$ are halogen atoms, alkoxy or alkylthio groups and $R_3$ is the cyclopropyl group, for example, cyclopropyl malonic acid dialkyl esters, in particular the diethyl ester (cf. L. J. Smith et al., J. Org. Chem. 15, 74 (1950)) are used as starting materials. The esters mentioned are condensed with thiourea to form 2-mercapto-5-cyclopropyl-4,6-pyrimidine diol which is methylated, e.g. with dimethyl sulphate in the presence of an acid binding agent, to form 2-methylthio-5-cyclopropyl-4,6-pyrimidine diol. This latter is also obtainable in one stpe by condensation of the malonic acid esters mentioned with S-methyl isothiourea. Then, in the pyrimidine diol obtained, the hydroxyl groups are replaced by chlorine by treatment with an inorganic acid halide such as phosphorus oxychloride in the presence of a tertiary organic base such as N,N-diethyl aniline and, if desired, the 2-methylthio-5-cyclopropyl-4,6-dichloropyrimidine obtained is reacted with the metal compound of a low alkanol to form a 2-methylthio-5-cyclopropyl-4,6-dialkoxypyrimidine. The corresponding 2-methylsulphonyl-5-cyclopropyl-pyrimidines, i.e. 2-methylsulphonyl-5-cyclopropyl-4,6-dichloropyrimidines and 2-methylsulphonyl - 5-cyclopropyl - 4,6-dialkoxypyrimidines are obtained from the 2-methylthio compounds mentioned by means of an oxidising agent, e.g. peracetic acid.

On the other hand, the 2-methylthio-5-cyclopropyl-4,6-pyrimidine diol mentioned above can be converted into 5-cyclopropyl-2,4,6-pyrimidine triol (5-cyclopropyl barbituric acid) e.g. by boiling with 10% aqueous chloracetic acid or with concentrated hydrochloric acid, and the latter compound can be modified by treatment with an inorganic acid halide in the presence of a tertiary organic base, e.g. with phosphorus oxychloride and N,N-diethylaniline, into 2,4,6 - trichloro-5-cyclopropyl-pyrimidine. This compound which is already embraced by the general Formula III can be used direct as starting material provided allowance is made for the simultaneous formation of isomeric $N^1$-(2,6-dichloro-5-cyclopropyl-4-pyrimidinyl)-sulphanilamide. Other compounds which can be used direct as starting materials are also obtained by converting, e.g. the trichloropyrimidine mentioned with a low alkylmercaptan in the presence of a low sodium alcoholate, into a 2,4-dichloro-5-cyclopropyl-6-alkylthio-pyrimidine. In the reaction of these pyrimidines according to the invention, $N^1$-(4-chloro-5-cyclopropyl-6-alkylthio-2-pyrimidinyl)-sulphanilamides are formed.

To produce a second group of starting materials of the general Formula III wherein $A_2$ is the direct bond, Z is a halogen atom or a low alkylsulphonyl group, $R_1$ is a halogen atom or a low alkoxy or alkylthio group, $R_2$ is the cyclopropyl group and $R_3$ is hydrogen, a low alkyl or alkoxy group, e.g. known esters of β-oxo-cyclopropane propionic acid, particularly the ethyl or methyl ester, or corresponding alkyl esters of α-alkyl-β-oxo- or α-alkoxy-β-oxocyclopropane propionic acids are used as starting materials, and the esters mentioned are condensed with thiourea to form 2-mercapto-6-cyclopropyl-, 2-mercapto-5-alkyl-6 - cyclopropyl- or 2-mercapto-5 - alkoxy-6-cyclopropyl-4-pyrimidinols. If S-alkyl thiourea is used as condensation component instead of thiourea, then instead of the 2-mercapto-4-pyrimidinols the corresponding 2-alkylthio-4-pyrimidinols are obtained. These intermediate products can be modified analogously to the production of the first group of starting materials, into 2-alkyl-sulphonyl pyrimidines, or the 2-alkylthio-pyrimidines can be converted by way of the 2-pyrimidinols into 2-halogenpyrimidines; in addition, the hydroxyl groups in the 4-position can be modified analogously into halogen or alkoxy groups. The following starting materials of the general Formula III, for example, are obtained: 2-methylsulphonyl-4 - chloro-6-cyclopropyl-, 2-methylsulphonyl-4-methoxy-6-cyclopropyl-, 2-methylsulphonyl-4 - bromo-6-cyclopropyl-, 2,4-dichloro-6-cyclopropyl- and 2,4-dibromo-6-cyclopropyl-pyrimidines and their 5-lower alkyl or 5-lower alkoxy derivatives as well as other corresponding 2-alkylsulphonyl pyrimidines.

The α-alkyl-β-oxo-cyclopropane propionic acid alkyl esters mentioned as condensation components can be obtained, e.g. from β-oxo-cyclopropane propionic acid alkyl esters and alkyl iodides in the presence of a low sodium alcoholate, and the corresponding α-alkoxy-β-oxocyclopropane propionic acid alkyl esters can be obtained from α-diazo-β-oxo-cyclopropane propionic acid alkyl esters and a low alkanol in the presence of copper and borotrifluoride etherate.

To produce a third group of starting materials of the general Formula III wherin $A_2$ is the direct bond, Z is a low alkylsulphonyl group or a halogen atom, $R_1$, $R_2$ and $R_3$ can be hydrogen or low alkyl groups and one of halogen $R_2$ and $R_3$ is the cyclopropyl group, for example, a dioxo compound of the general formula VI given below, or an acetal, enol ether, enamine or ketal of such a compound is condensed in the presence of an alkaline or acid condensing agent, with thiourea or S-alkyl-isothioureas. The optionally alkylated 2-alkylthio-5-cyclopropyl- or 2-alkylthio-6-cyclopropyl- pyrimidines obtained with S-alkyl isothioureas can be oxidised direct, e.g. by means of peracetic acid, to the corresponding 2-alkylsulphonyl pyrimidines of the general Formula III. The corresponding condensation products obtained from thiourea, i.e. the optionally alkylated 2-mercapto-5-cyclopropyl- or 2-mercapto-6-cyclopropyl-pyrimidines are converted into the corresponding 2-pyrimidinols, e.g. by boiling with 10% aqueous chloracetic acid or with concentrated hydrochloric acid. These intermediate products are then reacted with inorganic acid halides in the presence of tertiary organic bases, e.g. with phosphorus oxychloride and N,N-diethyl aniline, to form the corresponding, optionally alkylated 2-halogen-pyrimidines, e.g. 2-chloro-5-cyclopropyl- or 2-chloro-6-cyclopropyl-pyrimidines as well as their 4-, 5- and 6-lower alkyl or 4,6- and 4,5-di-lower alkyl derivatives, which are embraced by general Formula III. The 2-mercapto pyrimidines mentioned above can also be alkylated however, i.e. reacted in the presence of an acid binding agent with low dialkyl sulphates or alkyl chlorides, whereupon, as described above, the 2-alkylthio compounds obtained are oxidised to the 2-alkylsulphonyl compounds. Examples of such compounds of the general Formula III are 2-methylsulphonyl-5-cyclopropyl- and 2-methylsulphonyl-6-cyclopropyl pyrimidine as well as their 4-, 5- and 6-lower alkyl or 4,6- and 4,5-di-lower alkyl derivatives.

A fourth group of starting materials of the general Formula III wherein $A_2$ represents the imino group and Z represents hydrogen and $R_1$, $R_2$ and $R_3$ have the meanings given in Formula I, are obtained, e.g. from the 2-alkylsulphonyl compounds by reacting them with ammonia. They can also be obtained in another way, however, by reacting guanidine with alkyl esters of cyclopropyl malonic acid, β-oxo-cyclopropane propionic acids, α-alkyl-β-oxocyclopropane propionic acids or α-alkoxy-β-oxo-cyclopropane propionic acids and converting the reaction products, e.g. 2-amino-5-cyclopropyl-4,6-pyrimidine diol, 2-amino-6-cyclopropyl-4 - pyrimidinol, 2-amino-5-alkyl-6-cyclopropyl-4-pyrimidinols or 2-amino-5-alkoxy-6-cyclopropyl-4-pyrimidinols, with phosphorus oxychloride into 2-amino-5-cyclopropyl-4,6 - dichloropyrimidine, 2-amino-4-chloro-6-cyclopropyl - pyrimidine, 2-amino-4-chloro-5-alkyl-6-cyclopropyl - pyrimidines or 2-amino-4-chloro-5-alkoxy - 6 - cyclopropyl-pyrmidines, respectively. Corresponding low alkoxy- or alkylthio-pyrimidines can be produced again from these substituted chloropyrimidines with sodium and a low alkanol or alkane thiol.

In addition, the substituted 2-amino-pyrimidines can be coverted with nitric acid into corresponding 2-nitro-aminopyrimidines which form a fifth group of starting materials of the general Formula III.

An example of a sixth group of starting materials of the general Formula III, a substituted 2-cyanoamino-pyrimidine, is obtained, for example, by reacting dicyan diamide with 1-cyclopropyl-1,3-butane dione to form 2-cyanoamino-4 - methyl - 6-cyclopropyl-pyrimidine. Other compounds of this type can be produced analogously.

A compound of the general Formula I is produced by a second process according to the invention by reacting a compound of general Formula V:

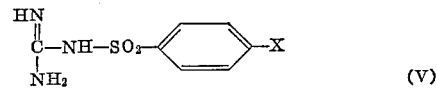

wherein X has the meaning given in Formula II, with a compound of the general Formula VI:

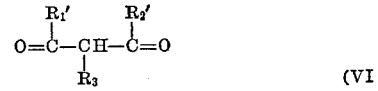

wherein $R_1'$ represents hydrogen or a lower alkyl group, $R_2'$ represents hydrogen, a lower alkyl group or the cyclopropyl group, and $R_3$ has the meaning given in Formula I, one of $R_2'$ and $R_3$ being the cyclopropyl group, or with an acetal, enol ether, enamine or ketal of such a compound, the reaction being performed in the presence of an alkaline or acid condensing agent, to form a compound of general Formula VII:

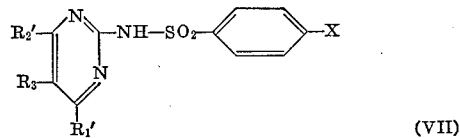

wherein $R_1'$ represents hydrogen or a lower alkyl group, $R_2'$ represents hydrogen, a lower alkyl group or the cyclopropyl group, $R_3$ has the meaning given in Formulas I and X that in Formula II, one of $R_2$ and $R_3$ being the cyclopropyl group, if necessary, modifying the substituent X in the reaction product of general Formula VII into the free amino group and, if desired, converting the reaction product into a salt with an inorganic or organic base.

The condensation of β-dioxo compounds of the general Formula VI or derivatives thereof with compounds of the general Formula V is performed, e.g. with the aid of alkali metal alcoholates, e.g. sodium methylate or sodium ethylate, in the corresponding low alkanols as solvent, while heating, e.g. at the boiling temperature of the alkanols. The alkali metal compounds of β-dioxo compounds are formed as intermediates. Condensations with diketones can also be performed, e.g. in glacial acetic acid or in alkanolic hydrochloric acid.

Examples of starting materials of the general Formula VI are derivatives of β-oxo-cyclopropane propionaldehyde, e.g. enamines such as 1-cyclopropyl-3-dimethyl-amino-2-propen-1-one and β-diketones such as 1-cyclopropyl-1,3-butane dione, 1-cyclopropyl-1,3-pentane dione or 1-cyclopropyl-1,3-hexane dione. These β-diketones can be produced, e.g. from cyclopropyl methyl ketone with low alkane carboxylic acid alkyl esters in the presence of a condensing agent such as sodium hydride. They can also be obtained in a two-step process by condensing sodium or magnesium compounds of corresponding alkanoyl acetic acid alkyl esters with cyclopropane carbonyl chloride to form diacylacetic acid alkyl esters and hydrolysing and decarboxylating the compounds obtained in an aqueous or aqueous/organic medium. The enamine mentioned, 1-cyclopropyl-3-dimethylamino-2-propen-1-one, can be produced from cyclopropyl methyl ketone and bisdimethylamino methoxymethane in ethanol.

The free sulphaguanidine ($N^1$-guanyl-sulphanilamide) is particularly suitable as starting material of the general Formula V, but also other compounds which contain, as radical X, one of the groups mentioned above which can be converted by hydrolysis or hydrogenolysis into the amino group, can be used. In particular, those compounds which occur as intermediate products in the production of sulphaguanidine, can be used.

A compound of general Formula I can be obtained by a third process according to the invention by reacting a compound of general Formula V wherein X has the meaning given in Formula II, with a low alkyl ester of β-oxo-carboxylic acid of the general Formula VIII:

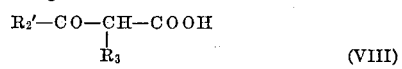

(VIII)

wherein $R_2'$ represents hydrogen, a lower alkyl group or the cyclopropyl group, and $R_3$ has the meaning given in Formula I, one of $R_2'$ and $R_3$ being the cyclopropyl group, or with a lower dialkyl ester of cyclopropyl malonic acid, to form a compound of the general Formula IX:

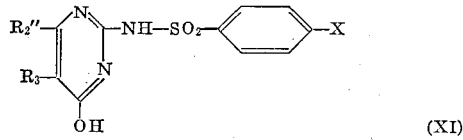

(XI)

wherein $R_2''$ represents hydrogen, a lower alkyl group, the cyclopropyl group or the hydroxyl group, $R_3$ has the meaning given in Formulas I and X that in Formula II, one of $R_2''$ and $R_3$ being the cyclopropyl group, and treating the reaction product of general Formula IX wherein $R_2''$ may be a hydroxyl group, with an inorganic acid halide to introduce one or two halogen atoms instead of one or two hydroxyl groups, if desired reacting the reaction product with a metal compound of a low alkanol or alkane thiol or reducing it to eliminate the halogen atoms(s) and also, if necessary, modifying the group X of the reaction product into the free amino group and, if desired, converting the compound obtained into a salt with an inorganic or organic base.

The condensation according to the invention is performed, for example, with the aid of alkali metal alcoholates, e.g. sodium methylate or sodium ethylate, in the corresponding low alkanols as solvents while heating, e.g. at the boiling temperature of the alkanols. The alkali metal compounds of the β-oxo esters are formed as intermediates. Insofar as such compounds result in the production of these substances, e.g. in the condensation of the cyclopropyl methyl ketone in the presence of sodium hydride with diethyl carbonate to form β-oxo-cyclopropane propionic acid ethyl esters, they can be used direct in the condensation according to the invention instead of the free starting materials and separate alkaline condensing agent.

Low alkyl esters, particularly methyl or ethyl esters, of compounds of general Formula VIII or of cyclopropyl malonic acid can be used as starting materials for the process according to the invention. Those processes for the production of such compounds which are not described in the literature have already been discussed at the end of the first process according to the invention. Examples of low alkyl esters of the general Formula VIII are the methyl or ethyl esters of β-oxo-cyclopropane propionic acid as well as its α-methyl, α-ethyl, α-propyl, α-isopropyl, α-methoxy, α-ethoxy, α-propoxy or α-isopropoxy derivatives and, also, corresponding low alkyl esters of α-cyclopropyl-β-oxo-butyric acid or of α-cyclopropyl-β-oxo-valeric acid.

The free sulphaguanidine ($N^1$-guanyl-sulphanilamide) is particularly suitable as starting material of the general Formula V, but also compounds can be used which contain, as radical X, one of the groups mentioned above which can be converted into the amino group by hydrolysis or hydrogenolysis. Particularly those compounds can be used which occur as intermediate products in the production of sulphaguanidine.

To further modify reaction products of the general Formula IX which contain one or two hydroxyl groups in the 4- or 4- and 6-position of the pyrimidine ring, these compounds are first converted by treatment with an inorganic acid halide in the presence of an acid binding agent, e.g. with phosphorus oxychloride and N,N-diethyl aniline, into the corresponding 4-halogen or 4,6-dihalogen compounds. The further reaction of the latter compounds to introduce low alkoxy or alkylthio groups or hydrogen into the 4- or 4- and 6-position of the pyrimidinyl radical and also any conversion of the radical X into the free amino group have been discussed at the end of the first process according to the invention.

If desired, the compounds of general Formula I obtained by the processes according to the invention are then converted into their salts with inorganic or organic bases. These salts are produced, e.g. by reacting the compounds of general Formula I with the equivalent amount of a base in a suitable aqueous/organic or organic solvent such as methanol, ethanol, ether, chloroform or methylene chloride.

Instead of the free compounds of general Formula I, their salts with bases can be used as medicaments. Suitable salts are those which in themselves have no physiological properties in the usual dosages. Also, it is of advantage if the salts to be used as medicaments crystallise well and are not or are only slightly hygroscopic. Suitable salts are, e.g. sodium, potassium, magnesium, calcium and ammonium salts as well as salts with ethylamine, dimethylamine, diethylamine, triethylamine, ethylenediamine, choline, benzylamine, dibenzylamine, pyridine, piperidine, morpholine, N-ethyl piperidine, aminoethanol, diethylaminoethanol, diethanolamine, triethanolamine and 1-(2-hydroxyethyl)-piperidine.

The new sulphanilamide derivatives corresponding to the general Formula I are suitable for the preparation of medicaments for internal or external use, e.g. for the treatment of infections by gram positive bacteria such as staphylococci, streptococci, pneumococci as well as by gram negative bacteria such as *Salmonella typhi*, *Escherichia coli* and *Klebsiella pneumoniae*.

The new active substances are administered orally and parenterally. The daily dosages of the free bases or of of pharmaceutically acceptable salts thereof vary between 100 and 5000 mg., preferably 300 to 5000 mg., for adult patients. Suitable dosage units such as tablets or ampoules preferably contain 100 to 700 mg., preferably 150 to 700 mg., of an active substance according to the invention or a pharmaceutically acceptable salt thereof. Also corresponding amounts of forms not made up into single dosages such as syrups, ointments or powders can be used.

Dosage units for oral administration preferably contain between 60% and 90% of a compound of the general Formula I or a pharmaceutically acceptable salt thereof as active substance. They are produced by combining the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets.

Ampoules for parenteral, particularly intramuscular, administration preferably contain a water soluble salt of an active substance in a concentration of, preferably, 5-10%, in aqueous solution, optionally together with suitable stabilising agents and buffer substances.

The following prescription further illustrates the production of tablets:

50.000 kg. of $N^1$-(6-cyclopropyl-2-pyrimidinyl)-sulphanilamide are mixed with 2.000 kg. of dried potato starch. The mass obtained is moistened with 1.200 kg. of stearic acid in 4 litres of ethanol and the whole is mixed for 15 minutes. 1.200 kg. of gelatine in 16 litres of distilled water are added and the mass is kneaded for 20 minutes. When it is evenly moistened, it is granulated through a sieve (25 meshes/sq. cm.) and dried. The dried granulate is again sieved (50 meshes/sq. cm.) and then mixed for 1 hour with 4.000 kg. of potato starch, 1.200 kg. of talcum and 0.400 kg. of sodium carboxymethyl cellulose. The mass obtained is pressed into 100,000 tablets each weighing 600 mg. and containing 500 mg. of active substance.

The following examples further illustrate the production of the new compounds of general Formula I and of hitherto undescribed intermediate products, but they in no way limit the scope of the invention. The temperatures are given in degrees centigrade.

EXAMPLE 1

(a) 2.53 g. of sodium are dissolved in 60 ml. of dry ethanol, 8.75 g. of thiourea and 15.6 g. of β-oxo-cyclopropane propionic acid ethyl ester are added and the mixture is refluxed and stirred for 7 hours at a bath temperature of 80–85°. Without isolating the 6-cyclopropyl-2-mercapto-4-pyrimidinol (6-cyclopropyl-2-thiouracil), first 20 ml. of water and then, dropwise, 9.3 ml. of dimethyl sulphate are added direct to the still hot mixture. The reaction is exothermic so that the addition of dimethyl sulphate brings the reaction mixture to the light boil. On completion of the addition, boiling is continued for 15 minutes and then the opaque solution is filtered and concentrated to dryness under vacuum. The residue is dissolved in 90 ml. of water, the pH is adjusted to 9 with a little 2 N sodium hydroxide solution and the solution is extracted twice with ether. The aqueous phase is acidified with 5 N hydrochloric acid to pH 1–2, stirred for 1 hour while cooling with ice and then the 6-cyclopropyl-2-methylthio-4-pyrimidinol is filtered off under suction; it melts at 196–198°.

The 6-cyclopropyl-2-methylthio-4-pyrimidinol is also obtained when 16.7 g. of S-methyl-isothiourea sulphate in 40 ml. of dry methanol are reacted with a solution of 5.06 g. of sodium in 40 ml. of dry methanol, then 15.6 g. of β-oxo-cyclopropane propionic acid ethyl ester are added while cooling with ice and the whole is stirred for 20 hours while cooling with ice and then for 4 days at 20–25°. The reaction mixture is concentrated to dryness under vacuum and the residue is dissolved in 100 ml. of water. The solution is acidified to pH 1 by the addition of 5 N hydrochloric acid, the precipitated 6-cyclopropyl-2-methylthio-4-pyrimidinol is filtered off under suction, washed with a little water and dried; it melts at 196–199°.

(b) A mixture of 34 ml. of phosphorus oxychloride, 6.8 ml. of N,N-diethyl aniline and 6.8 g. of 6-cyclopropyl-2-methylthio-4-pyrimidinol is stirred for 45 minutes at a bath temperature of 90°. The pale brown solution is then concentrated to dryness in vacuo, ice is added to the oily residue which is then extracted three times with ether. The ether extracts are then washed first with ice cold 5% sodium bicarbonate solution, then with saturated sodium chloride solution and dried over sodium sulphate. After evaporation of the ether, the crude 6-cyclopropyl-4-chloro-2-methylthio-pyrimidine remains which is sufficiently pure for the following reactions.

(c) 1.9 g. of 6-cyclopropyl-4-chloro-2-methylthio-pyrimidine are sprinkled into 21 ml. of a stirred 10% solution of peracetic acid in glacial acetic acid at 7–9°. The exothermic reaction causes a rise of 15° in temperature. Stirring is continued for 10 minutes at an inner temperature of 30° and then for 3 minutes at 80°. The reaction mixture is then concentrated under 12 torr, water is added to the concentrate and it is cooled with ice for 2 hours. The crude sulphone, 6-cyclopropyl-4-chloro-2-methylsulphonyl-pyrimidine, is filtered off under suction; it then melts at 102–104°.

(d) 1.5 g. of the crude sulphone are stirred with 2.52 g. of sulphanilamide sodium salt in 14 ml. of dimethyl formamide at a bath temperature of 80° for 20 hours. The dimethyl formamide is then distilled off under high vacuum and the residue is dissolved in water. The pH of the solution is adjusted to 8–9 by the addition of solid carbonic acid and, after stirring for 1 hour in an ice bath, the precipitated sulphanilamide is filtered off under suction. The pH of the filtrate is adjusted to 5–6 with 5 N hydrochloric acid and, after cooling for 1 hour in an ice bath, the crude product is filtered off. Pure $N^1$-(6-cyclopropyl-4-chloro-2-pyrimidinyl)-sulphanilamide is obtained by crystallisation from iso-propanol/water (2:1). It melts at 167–168° with gas development.

(e) In the compound obtained according to 1 d), the chlorine atom may be replaced by an alkoxy group in the following manner: 1 g. of $N^1$-(6-cyclopropyl-4-chloro-2-pyrimidinyl)-sulphanilamide is added to a solution of 0.23 g. of sodium in 20 ml. of dry methanol and the mixture is boiled for 20 hours while stirring. The methanol is then distilled off and the residue is dissolved in water. After adding 5 N hydrochloric acid until the pH is 5, the crude product precipitates. It is recrystallised from isopropanol/water and dried for 30 hours at 80° under 0.1 torr. The substance sinters slightly; it is mixed well once during the drying process. The $N^1$-(6-cyclopropyl-4-methoxy-2-pyrimidinyl)-sulphanilamide melts at 140–141°.

(f) Furthermore, in a compound obtained according to 1 d), the chlorine atom may be replaced by hydrogen in the following way: 3.25 g. of the $N^1$-(6-cyclopropyl-4-chloro-2-pyrimidinyl)-sulphanilamide are suspended in 500 ml. of water, 20 ml. of 1 N sodium hydroxide and 2 g. of a 5% palladium/barium sulphate catalyst are added and the whole is hydrogenated at 20° under normal pressure. 95% of the theoretical amount of hydrogen has been taken up after 24 hours. The catalyst is filtered off and washed with water and the filtrate is acidified to pH 5–6 with 5 N hydrochloric acid. A precipitate is formed which is filtered off under suction and recrystallised from aqueous ethanol. The crystals obtained are dried in vacuo at 70°, whereupon the pure $N^1$-(6-cyclopropyl-2-pyrimidinyl)-sulphanilamide melts at 241–243° with decomposition.

EXAMPLE 2

(a) 1.15 g. of sodium are dissolved in 50 ml. of dry methanol and 10.7 g. of anhydrous sulphaguanidine are added. The mixture is brought to the boil while stirring and then 7.8 g. of β-oxo-cyclopropane propionic acid ethyl ester are added dropwise. The mixture is then refluxed for 18 hours. The reaction mixture is then cooled for 3 hours with ice and the precipitated crude product is filtered off under suction. The filter residue is dissolved in 50 ml. of water and the solution is adjusted to pH 4–5 with glacial acetic acid. After cooling and stirring in an ice bath for 2 hours, the crude $N^1$-(6-cyclopropyl-4-hydroxy-2-pyrimidinyl)-sulphanilamide is filtered off under suction.

A further amount of the reaction product can be obtained from the above methanolic filtrate by concentrating the latter to dryness, extracting the residue with aqueous sodium hydroxide solution at pH 10 and precipitating the reaction product from the alkaline extract by the addition of glacial acetic acid at pH 4–5.

On recrystallising twice from ethanol/water (1:1), pure substance which melts at 226–228° is obtained.

(b) 1 g. of $N^1$-(6-cyclopropyl-4-hydroxy-2-pyrimidinyl)-sulphanilamide is added to a mixture of 15 ml. of phosphorus oxychloride and 2 ml. of N,N-diethyl aniline and the whole is stirred for 2 hours at a bath temperature of 100°. Excess phosphorus oxychloride is then distilled off under 12 torr and the oily residue is poured into 150 ml. of 2 N ice cold sodium carbonate solution. The whole is stirred for 2 hours at 20–25° and then extracted with ether. The pH of the aqueous phase is adjusted to 3–4 with 5 N hydrochloric acid and left to stand for a few hours at 4°. The amorphous precipitate is filtered off under suction, dried over phosphorus pentoxide and continuously extracted for 8 hours with hot benzene. On concentrating the benzene extract, the crude $N^1$-(6-cyclopropyl-4-chloro-2-pyrimidinyl)-sulphanilamide is obtained which melts at 160–162°. On crystallising from benzene or from a mixture of isopropanol/water (2:1), the pure product is obtained which melts at 167–168°.

The substance is polymorphous. On a single crystallisation from isopropanol/water, a melting point of 137–139° was observed. A subsequent crystallisation of this substance from benzene showed a melting point of 167–168°.

EXAMPLE 3

(a) 3.4 g. of 6-cyclopropyl-2-mercapto-4-pyrimidinol (produced according to Example 1, isolated by precipitation with 5 N hydrochloric acid) are refluxed for 10 hours with a solution of 6.5 g. of chloracetic acid and 60 ml. of water. The reaction mixture is then cooled in an ice bath and the precipitated crude 6-cyclopropyl uracil is filtered off under suction. It melts at 211–217° and is sufficiently pure for the following reaction.

(b) 3.1 ml. of N,N-diethyl aniline are added to 15.5 ml. of phosphorus oxychloride and then 3.1 g. of crude 6-cyclopropyl uracil are sprinkled in. The mixture is stirred for 30 minutes at a bath temperature of 90°. The dark brown solution is then concentrated under 12 torr while gently heating. The residue is poured onto ice and the mixture is extracted three times with ether. The ether extract is washed once with water, dried with sodium sulphate and then concentrated. The crude 6-cyclopropyl-2,4-dichloropyrimidine remains as an oil.

(c) 7.8 g. of sulphanilamide sodium salt and 3.1 g. of crude 6-cyclopropyl-2,4-dichloropyrimidine in 15 ml. of dimethyl formamide are stirred for 1 hour at 20° and for 14 hours at a bath temperature of 40°. The mixture is then concentrated to dryness under about 0.1 torr and the residue is dissolved in water. The pH of the aqueous solution is adjusted to 8–9 by the addition of carbon dioxide. It is then cooled for 1 hour in an ice bath and the excess sulphanilamide is filtered off under suction. The pH of the filtrate is adjusted to 4–5 with 5 N hydrochloric acid whereupon the brown crude product precipitates, first in as greasy form which then crystallises. It is dried over phosphorus pentoxide and then extracted with boiling benzene in a Soxhlet apparatus. The benzene extract is then extracted with 1 N sodium carbonate solution. 5 N hydrochloric acid is added to the aqueous/alkaline phase until the pH is 5–6 whereupon crystalline, white $N^1$-(6-cyclopropyl-4-chloro-2-pyrimidinyl) - sulphanilamide precipitates. Thin layer chromatography shows an $R_f$ value of 0.53 (solvent: chloroform/methanol, 4:1; Merck Kieselget G; developer: p-dimethylaminobenzaldehyde). It is identical with the product obtained according to Examples 1d and 2b.

EXAMPLE 4

(a) A solution of 5.3 g. of sodium in 50 ml. of methanol is stirred vigorously, refluxed and 10.1 g. of guanidine carbonate are added in portions. The hot suspension is left to stand for 20 minutes, then filtered under suction and the residue is washed with dry methanol. The clear filtrate is stirred, refluxed and 15.6 g. of β-oxo-cyclopropane propionic acid ethyl ester are added dropwise. The reaction mixture is then stirred and boiled for another 5 hours whereupon the methanol is distilled off. The residue is dissolved in 30 ml. of hot water and the pH of the solution is adjusted to 5–6 with glacial acetic acid. The reaction mixture is then left to stand for 16 hours at 4°, the precipitate is filtered off and washed with water, and the filtrate is diluted with water. The crude 2-amino-6-cyclopropyl-4-pyrimidinol precipitates. After recrystallisation from water, it melts at 202–203°.

(b) 3.0 g. of the crude pyrimidinol obtained according to Example 4a are added to a mixture of 20 ml. of phosphorus oxychloride and 4 ml. of N,N-diethyl aniline and the mixture is heated for 45 minutes at 90°. Excess phosphorus oxychloride is distilled off under vacuum, ice is added to the brown residue and the suspension is extracted with ether. The ether extract is washed with a little water and dried over sodium sulphate. After distilling off the solvent, crude 2-amino-6-cyclopropyl-4-chloropyrimidine is obtained.

(c) 7.1 g. of the crude chloride obtained according to Example 4b are added to a solution of 2.3 g. of sodium in 110 ml. of dry methanol. The mixture obtained is stirred for 18 hours at a bath temperature of 80–90°. The suspension is then concentrated in vacuo, the residue is stirred with 40 ml. of water and the suspension is extracted with ether. The ether solution is dried over sodium sulphate and concentrated. The residue is crystallised from ethanol/water and the crystals obtained are dried over phosphorus pentoxide in vacuo at 20°. The 2-amino-4-methoxy-6-cyclopropyl-pyrimidine obtained melts at 72–74°.

(d) 1.3 g. of 2-amino-4-methoxy-6-cyclopropyl-pyrimidine are dissolved in 4 ml. of dry pyridine and, while stirring at 20°, 2.07 g. of p-chlorosulphonyl carbanilic acid methyl ester [(p-methoxycarbonylamino)-benzene sulphochloride] are added in portions. The reaction mixture is stirred for 25 minutes at 20° and for 1 hour at 60°. The brown reaction solution is then concentrated in vacuo. The residue is stirred in 40 ml. of 1 N sodium hydroxide solution for 1 hour at a bath temperature of 90–100°. The opaque solution obtained is filtered and the pH of the filtrate is adjusted to 5–6 with 5 N hydrochloric acid. The crude product precipitates, it is filtered off under suction, washed with water, recrystallised from isopropanol/water and dried under high vacuum at 60°. The $N^1$-(6-cyclopropyl-4-methoxy-2-pyrimidinyl)-sulphanilamide obtained melts at 140–141°.

EXAMPLE 5

(a) 9.6 g. of sodium hydride are stirred with 35.2 g. of acetic acid ethyl ester and 2 drops of dry ethanol are added. After a few minutes, development of hydrogen can be seen, whereupon a solution of 16.8 g. of cyclopropyl methyl ketone in 50 ml. of dry ether is added dropwise at 25–30°. The reaction mixture, which gradually becomes more and more of a slurry, is diluted with 20 ml. of dry ether, the suspension is stirred for 14 hours at a bath temperature of 40–50° and is then cooled to 20°. 100 ml. of ether and 30 ml. of ethanol are then added, the reaction vessel is rinsed with nitrogen and a mixture of 80 ml. of 5 N hydrochloric acid and 300 g. of ice cubes are added all at once. Two phases are formed; the aqueous phase is separated and washed with fresh ether. The combined ether extracts are then washed with a dilute sodium hydrogen carbonate solution, and also with water, dried over sodium sulphate, distilled and fractionated. The 1-cyclopropyl-1,3-butane dione obtained boils at 70–73°/14 torr.

(b) 7.2 g. of the diketone obtained according to Example 5a, 23 ml. of n-amyl alcohol, 4.55 ml. of glacial acetic acid and 12.25 g. of sulphaguanidine are mixed and stirred for 15 hours at a bath temperature of 145–150°. A dark yellow suspension is formed which is diluted with 5 ml. of n-amyl alcohol and then heated for another 5 hours. The reaction mixture is then concentrated in vacuo and the oil which remains is stirred with 50 ml. of 2 N sodium hydroxide solution. The precipitate formed, which consists of non-reacted sulphaguanidine, is filtered off under suction and extracted a second time with 2 N sodium hydroxide solution. The combined extract is washed with ether and the aqueous phase is acidified to pH 5–6 with 5 N hydrochloric acid. The crude product precipitates. It is recrystallised twice from acetic acid ethyl ester, the mother liquors being purified with ative charcoal. The pure $N^1$ - (6-cyclopropyl-4-methyl-2-pyrimidinyl)-sulphanilamide obtained melts at 146–148°.

EXAMPLE 6

(a) 4.45 g. of 2-methyl-isothiourea sulphate and 5.8 g. of cyclopropyl malonic acid diethyl ester are added to a solution of 1.35 g. of sodium in 35 ml. of dry methanol and the mixture obtained is stirred for 4 days at 30° while excluding moisture. It is then concentrated in vacuo. The residue obtained is dissolved in 20 ml. of water and the solution is acidified to pH 6 with 6 N hydrochloric acid. The crude 2-methylthio-5-cyclopropyl-4,6-pyrimidine diol precipitates; the suspension is left to stand for 8 hours, the crude product is filtered off, washed with water and dried in vacuo at 60°.

(b) 9 g. of the crude product obtained according to Example 6a are added to 63 ml. of phosphorus oxychloride while cooling with ice and 4.5 ml. of N,N-diethyl aniline are added dropwise to the mixture. The reaction vessel is then put into a bath which is heated to 90–100° within 15 minutes, whereupon a clear solution is formed. The bath temperature is maintained for 1½ hours, then excess phosphorus oxychloride is distilled off in vacuo and the residue is poured onto ice. The reaction mixture is extracted with ether, the ether extract is washed with water and dried over sodium sulphate. After evaporating off the ether, the crude 2-methylthio-5-cyclopropyl-4,6-dichloropyrimidine crystallises, M.P. 65–70°. Recrystalisation from petroleum ether raises the melting point to 78–80°.

(c) 8 g. of the methylthio compound obtained according to Example 6b are added to 74 ml. of a 10% (percent by weight) of peracetic acid solution in glacial acetic acid, the addition being made within 30 minutes at 7–9°. The reaction mixture is then stirred, first for 10 minutes at 20° and then for 10 minutes at 80–90°, after which it is concentrated in vacuo. Water is added to the residue which is then filtered off and, after drying over phosphorus pentoxide, it is recrystallised from ether/hexane. The pure 2-methylsulphonyl-5-cyclopropyl - 4,6 - dichloropyrimidine melts at 134–136°.

(d) 2.30 g. of the product obtained according to Example 6c and 3.34 g. of sulphanilamide sodium salt in 20 ml. of dry dimethyl formamide are stirred for 6 hours at a bath temperature of 80°. The solvent is removed under high vacuum, the residue is mixed with 20 ml. of water and acidified to pH 3–4 with 2 N hydrochloric acid. A greasy precipitate first forms which after some time solidifies. It is dissolved in aqueous sodium carbonate solution, the solution is filtered and the pH of the filtrate is adjusted to 4–5 with 6 N hydrochloric acid. The crude product precipitates and is recrystallised from aqueous ethanol. The $N^1$-(5-cyclopropyl-4,6-dichloro - 2 - pyrimidinyl)-sulphanilamide obtained melts at 193–195°.

(e) In the compound obtained according to 6d, the chlorine atoms may be replaced by hydrogen in the following manner:

3.1 g. of $N^1$-(5-cyclopropyl-4,6-dichloro-2-pyrimidinyl)-sulphanilamide are dissolved in 1 litre of water and 50 ml. of 1 N sodium hydroxide solution and, in the presence of palladium/barium sulphate catalyst, the solution is dehalogenated with hydrogen under normal pressure at 20°. The hydrogenation mixture is filtered, washed with 50 ml. of water and the pH of the filtrate is adjusted to 5 with 6 N hydrochloric acid. The suspension formed is left to stand for some hours at 5°, the precipitate is then filtered off under suction, washed with water and recrystallised from aqueous ethanol. The pure $N^1$-(5-cyclopropyl-2-pyrimidinyl)-sulphanilamide obtained melts at 225–226°.

EXAMPLE 7

(a) 182 ml. of dry ethanol are added to 16.8 g. of cyclopropyl methyl ketone. The mixture obtained is stirred and, at a temperature of 65–70°, a solution of 32.8 g. of bis-(dimethylamino)-methoxymethane (cf. H. Bredereck et al., Chem. Ber., 98, 1078 (1965)) in 122 ml. of dry ethanol is added dropwise within 3 hours, whereupon the whole is refluxed for 15 hours. The ethanol is then distilled off and the residue is fractionated. The pure 1-cyclopropyl-3-dimethylamino-propen-1-one boils at 100–103°/0.007 torr and, after solidifying, melts at 44–46°.

(b) 7.1 g. of the ketone obtained according to Example 7a and 11 g. of guanidine carbonate are stirred in 10 ml. of ethylene glycol monoethyl ether and reacted for 16 hours at a bath temperature of 140–150°. The reaction mixture is cooled to 20°, diluted with water and extracted three times with methylene chloride. The three extracts are washed, one after the other, twice with water, then combined and dried over sodium sulphate. After distilling off the methylene chloride, crude, crystalline 2-amino-6-cyclopropyl pyrimidine remains which melts at 135–137°.

(c) 4.3 g. of the crude amine obtained according to Example 7b are stirred with 13 ml. of dry pyridine and 7.98 g. of N-acetyl-sulphanilyl chloride are added in portions to the suspension obtained. The reaction is slightly exothermic and a yellow solution is formed. After stirring for 18 hours at 20–25°, the reaction mixture is diluted with 130 ml. of water, the pH is adjusted to 1 with 2 N hydrochloric acid and the crude $N^4$-acetyl-$N^1$-(6-cyclopropyl-2-pyrimidinyl)-sulphanilamide is filtered off under suction. It is washed with water and dried in vacuo at 100°. It melts at 250° with decomposition. The pure compound is obtained by recrystallising once from aqueous ethylene glycol monomethyl ether. It melts at 265° (with decomposition).

(d) 7.9 g. of the acetyl compound described in Example 7c are hydrolysed for 2½ hours with 84 ml. of 2 N sodium hydroxide solution at a bath temperature of 110°. The solution is treated with active charcoal, filtered and the filtrate is acidified with 5 N hydrochloric acid to pH 5. The precipitated, crude $N^1$-(6-cyclopropyl-2-pyrimidinyl)-sulphanilamide is filtered off under suction, washed with water and the crude product is recrystallised from aqueous ethylene glycol monomethyl ether. It melts with decomposition at 241–243° and is identical with the compound produced according to Example 1f.

EXAMPLE 8

(a) 2.68 g. of sodium are added to 37 ml. of dry methanol, the solution obtained is vigorously stirred and brought to the boil. 5.05 g. of guanidine carbonate are then added to the reaction mixture, this is refluxed for 20 minutes and the precipitate is filtered off under suction. The filtrate is stirred, boiled and 10 g. of cyclopropyl malonic acid diethyl ester are added dropwise under an atmosphere of nitrogen. After the reaction mixture has been refluxed for 20 hours, it is concentrated in vacuo and the residue obtained is dissolved in warm water. The solution is decoloured with active charcoal and the filtrate is acidified with 5 N hydrochloric acid to pH 4. The precipitated, crude 2-amino-5-cyclopropyl-4,6-pyrimidine diol is filtered off under suction, washed with water and dried in vacuo at 100°; it melts at 260° (with decomposition).

(b) 7.35 ml. of dry pyridine are added dropwise to 73 ml. of ice cold phosphorus oxychloride and then 7.3 g. of the pyrimidine diol obtained according to Example 8a are added. The mixture is heated for 2½ hours at a bath temperature of 100° and the brown solution obtained is concentrated in vacuo. Ice is added to the residue and the pH is adjusted to 5 at 0° with 2 N sodium carbonate solution. The precipitate is filtered off under suction, dried in vacuo at 60° and digested three times with 100 ml. of warm ether each time. Recrystallisation from ether/hexane yields pure 2-amino-5-cyclopropyl-4,6-dichloro-pyrimidine which melts at 166–167°.

(c) 1.2 g. of sodium are added to 50 ml. of dry methanol and the solution obtained and 3.55 g. of 2-amino-5-cyclopropyl-4,6-dichloropyrimidine are heated for 4 hours in an autoclave at 120°. The reaction mixture is concentrated in vacuo and the residue is extracted with methylene chloride. After distilling off the methylene chloride an amorphous residue remains which is stirred with water for 1 hour. The crude product obtained is filtered off and, after drying in vacuo at 30°, recrystallised from hexane. The pure 2-amino-5-cyclopropyl-4,6-dimethoxy-pyrimidine melts at 86–88°.

(d) 1.45 g. of the amine obtained according to Example 8c are dissolved in 3.8 ml. of dry pyridine and then 1.92 g. of N-acetyl-sulphanilyl chloride are added while stirring. A yellow solution is immediately formed which is left to stand for 22 hours at 20°. After adding 50 ml. of water and 5 N hydrochloric acid until the pH is 2, crude N⁴-acetyl-N¹-(5-cyclopropyl-4,6-dimethoxy - 2 - pyrimidinyl)-sulphanilamide precipitates.

(e) 4 g. of the crude, moist acetyl compound obtained according to Example 8d and 40 ml. of 2 N sodium hydroxide solution are heated for 2 hours at a bath temperature of 100°. A precipitate is formed which is dissolved by the addition of hot water. The hot solution is decoloured with active charcoal, the active charcoal is filtered off under suction and, after cooling the filtrate, the latter is adjusted to pH 4–5 with 5 N hydrochloric acid. The mixture is cooled for 1 hour in an ice bath and the precipitate is then filtered off under suction. Recrystallisation of the crude product from aqueous ethanol yields the pure N¹-(5 - cyclopropyl-4,6-dimethoxy-2-pyrimidinyl) - sulphanilamide which melts at 220–222°.

EXAMPLE 9

5.5 g. of N¹-(5-cyclopropyl-4-chloro-6-methoxy-2-pyrimidinyl)-sulphanilamide are dehalogenated analogously to Example 1f with hydrogen using 2 g. of 10% palladium charcoal as catalyst. The crude product is recrystallised from methoxyethanol/water. The pure N¹-(5-cyclopropyl-6-methoxy-2-pyrimidinyl)-sulphanilamide melts at 242–244°.

EXAMPLE 10

(a) 8.3 g. of sodium and 190 ml. of dry ethanol are reacted analogously to Example 1 with 13.7 g. of thiourea and 25.5 g. of α-methyl-β-oxo-cyclopropane propionic acid ethyl ester and the product is then methylated with 18.9 g. of dimethyl sulphate. The crude 6-cyclopropyl-5-methyl-2-methylthio-4-pyrimidinol obtained melts at 201–211° and is used direct for the following reaction.

(b) 16.7 g. of 6-cyclopropyl-5-methyl-2-methylthio-4-pyrimidinol are reacted according to Example 1b with 117 ml. of phosphorus oxychloride and 8.35 ml. of N,N-diethylaniline, and the crude, oily 6-cyclopropyl-4-chloro-5-methyl-2-methylthio-pyrimidine is used for further reaction direct.

(c) 13.3 g. of the crude chlorine compound obtained according to b are oxidised analogously to Example 1c with 113 ml. of a 10% peracetic acid solution in acetic acid. The crude 6-cyclopropyl-4-chloro-5-methyl-2-methylsulphonyl-pyrimidine melts at 110–113° and is used for further reaction direct.

(d) 12.3 g. of the crude sulphone obtained according to Example 10c are reacted analogously to Example 1d with 21.4 g. of sulphanilamide sodium in 45 ml. of dry dimethyl formamide. The crude product obtained is recrystallised from methoxyethanol/water and the pure N¹-(6 - cyclopropyl-4-chloro-5-methyl-2-primidinyl) - sulphanilamide melting at 208° (with decomposition) is obtained.

EXAMPLE 11

6 g. of N¹-(6-cyclopropyl-4-chloro-5-methyl-2-pyrimidinyl)-sulphanilamide are dehalogenated with hydrogen analogously to Example 1f using 2 g. of palladium charcoal catalyst.

Crystallisation of the crude product from methoxyethanol/water yields pure N¹-(6-cyclopropyl-5-methyl-2-pyrimidinyl)-sulphanilamide, M.P. 246–248°.

EXAMPLE 12

2.54 g. of sodium methylate and 5.35 g. of N¹-(6-cyclopropyl-4-chloro-5-methyl-2-pyrimidinyl) - sulphanilamide in 30 ml. of dry dimethyl formamide are heated for 63 hours at a bath temperature of 50–60°. After cooling, the pale brown coloured reaction mixture is diluted with 30 ml. of water and the pH is adjusted to 5–6 with 2 N hydrochloric acid. After standing for 1 hour in an ice bath, the precipitate is filtered off and recrystallised once with alcohol and once with water. The pure N¹-(6-cyclopropyl-4-methoxy-5-methyl-2-pyrimidinyl)-sulphanilamide melts at 211.5–213.5°.

I claim:
1. A compound of the formula

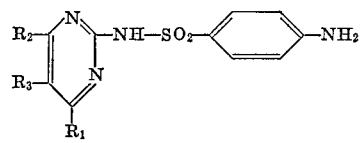

wherein $R_1$ is hydrogen, halogen, (lower)alkyl, (lower)alkoxy, or (lower)alkylthio; one and only one of $R_2$ and $R_3$ is cyclopropyl; $R_2$ when other than cyclopropyl is hydrogen, halogen, (lower)alkyl, (lower)alkoxy or (lower)alkylthio; and $R_3$ when other than cyclopropyl is hydrogen, (lower)alkyl or (lower)alkoxy.

2. A nontoxic pharmaceutical acceptable alkali metal, alkaline earth metal, or organic amine salt of a compound according to claim 1.

3. A compound as defined in claim 1, wherein said halogen is chlorine or bromine.

4. A compound as defined in claim 1, wherein said halogen is chlorine.

5. A compound as defined in claim 1, wherein $R_1$ and $R_2$ are each hydrogen and $R_3$ is cyclopropyl.

6. A compound as defined in claim 1, wherein $R_1$ is chloro, $R_3$ is hydrogen and $R_2$ is cyclopropyl.

7. A compound as defined in claim 1, wherein $R_1$ and $R_3$ are each hydrogen and $R_2$ is cyclopropyl.

8. A compound as defined in claim 1, wherein $R_1$ is methyl, $R_3$ is hydrogen and $R_2$ is cyclopropyl.

9. A compound as defined in claim 1, wherein $R_1$ is methoxy, $R_3$ is hydrogen and $R_2$ is cyclopropyl.

10. A compound as defined in claim 1, wherein $R_1$ is chloro, $R_3$ is methyl and $R_2$ is cyclopropyl.

11. A compound as defined in claim 1, wherein $R_1$ and $R_2$ are each chloro and $R_3$ is cyclopropyl.

12. A compound as defined in claim 1, wherein $R_2$ is hydrogen, $R_1$ is methoxy and $R_3$ is cyclopropyl.

References Cited

UNITED STATES PATENTS 2,407,966   2/1967   Sprague _____ 260—239.75

HENRY R. JILES, *Primary Examiner.*

H. I. MOATZ, *Assistant Examiner.*

U.S. Cl. X.R.

260—251, 256.4, 397.7, 457, 483, 593, 594; 424—229

U.S. DEPARTMENT OF COMMERCE
PATENT OFFICE
Washington, D.C. 20231

UNITED STATES PATENT OFFICE
CERTIFICATE OF CORRECTION

Patent No. 3,441,560                                          April 29, 1969

Markus Zimmermann

It is certified that error appears in the above identified patent and that said Letters Patent are hereby corrected as shown below:

Column 1, line 19, "antibacteria" should read -- antibacterial --. Column 3, line 4, cancel "into the amino group are, e.g. the nitro group" and insert -- radical, or low alkoxycarbonylamino radicals, --. Column 4, line 7, "stpe" should read -- step --. Column 5, line 7, "wherin" should read -- wherein --; line 66, "coverted" should read -- converted --. Column 6, line 31, "$R_2$" should read -- $R_2'$ --. Column 12, line 33, "20 ml" should read -- 200 ml --; line 61, "ative" should read -- active --.

Signed and sealed this 24th day of March 1970.

(SEAL)
Attest:

Edward M. Fletcher, Jr.                            WILLIAM E. SCHUYLER, JR.
Attesting Officer                                               Commissioner of Patents